United States Patent

[11] 3,597,800

[72] Inventor Abe Silverman
 Chicago, Ill.
[21] Appl. No. 808,959
[22] Filed Mar. 20, 1969
 Division of Ser. No. 606,601, Jan. 3, 1967, 3,464,418.
[45] Patented Aug. 10, 1971
[73] Assignee Silveco Products, Inc.
 Chicago, Ill.

[54] APPARATUS FOR MAKING BRASSIERE PADS
 4 Claims, 19 Drawing Figs.
[52] U.S. Cl. .................................................. 18/19 R,
 264/292, 18/DIG. 37, 18/DIG. 41, 18/DIG. 53, 18/19 P
[51] Int. Cl. .................................................. B29g 1/00, A41c 5/00
[50] Field of Search .................................. 18/19 P, 19 BC, 19 M, 19 R, 19 F, DIG. 53, DIG. 48, DIG. 37, DIG. 41; 128/463, 464, 478, 479, 480, 481; 264/324, 292; 25/54, 55; 249/160, 161, 162; 17/32

[56] References Cited
UNITED STATES PATENTS
2,499,565 5/1950 Booth ......................... 18/30 US UX
3,434,478 3/1969 Liebowitz et al. ........... 128/464 X Primary Examiner—J. Spencer Overholser
Assistant Examiner—David S. Safran
Attorney—Charles B. Cannon ABSTRACT: Molded seamless brassiere pads or cups made from thermoplastic adhesive bonded nonwoven fibrous batting and an apparatus and method for molding the same without thinning of the cross-sectional area of the apex portion of the brassiere pad or cup relative to the cross-sectional thickness of the remaining wall portions of the pad or cup. To this end a central portion of the blank from which the pad is molded under heat and pressure is subjected prior to the molding operation to the action of a coolant to prevent the thermoplastic adhesive bond in the bonded nonwoven fibrous batting from being softened during the molding operation. The thus cooled central portion of the body of the blank is held in position in the mold by piercing elements mounted on the male mold member and which project into the loosely arranged fibers in the cooled central area of the inner surface of the body of the blank without forming unsightly or objectionable holes or other marks therein. A molded seamless brassiere pad or cup is formed in which the cross-sectional thickness of the apex portion of the pad or cup is not reduced relative to the cross-sectional thickness of the remaining wall portions of the pad or cup and the apex portion of the pad or cup is not otherwise weakened.

Patented Aug. 10, 1971
3,597,800
4 Sheets-Sheet 1
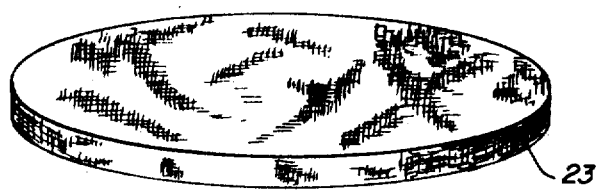
FIG. 1
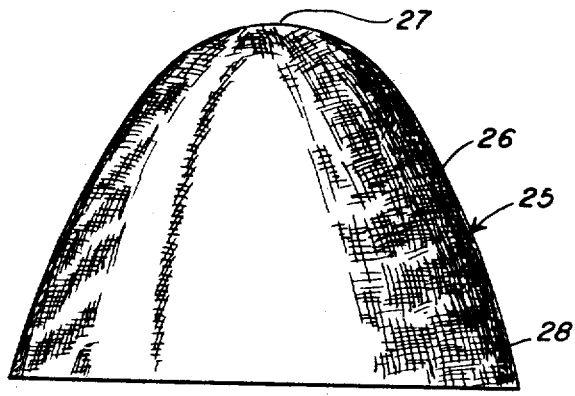
FIG. 2
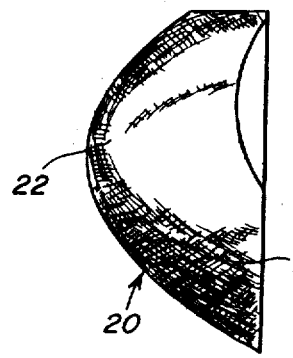
FIG. 3
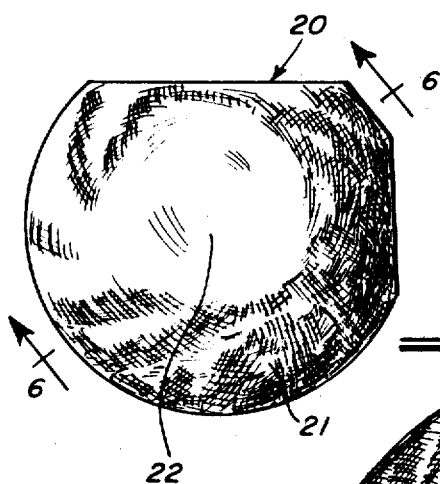
FIG. 4
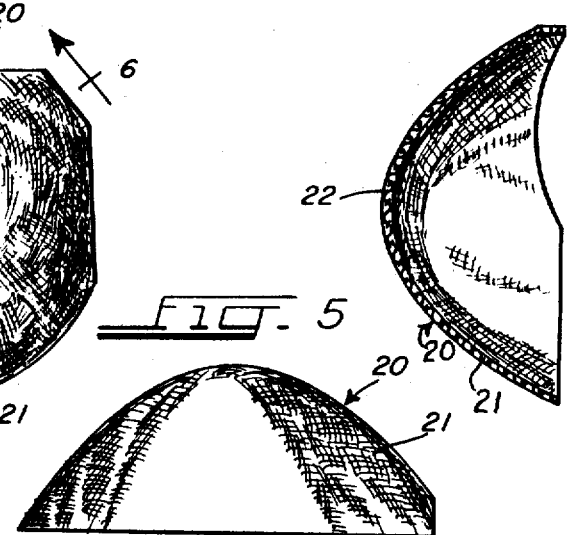
FIG. 5
FIG. 6
INVENTOR.
ABE SILVERMAN
Charles B. Connor
HIS ATTY.

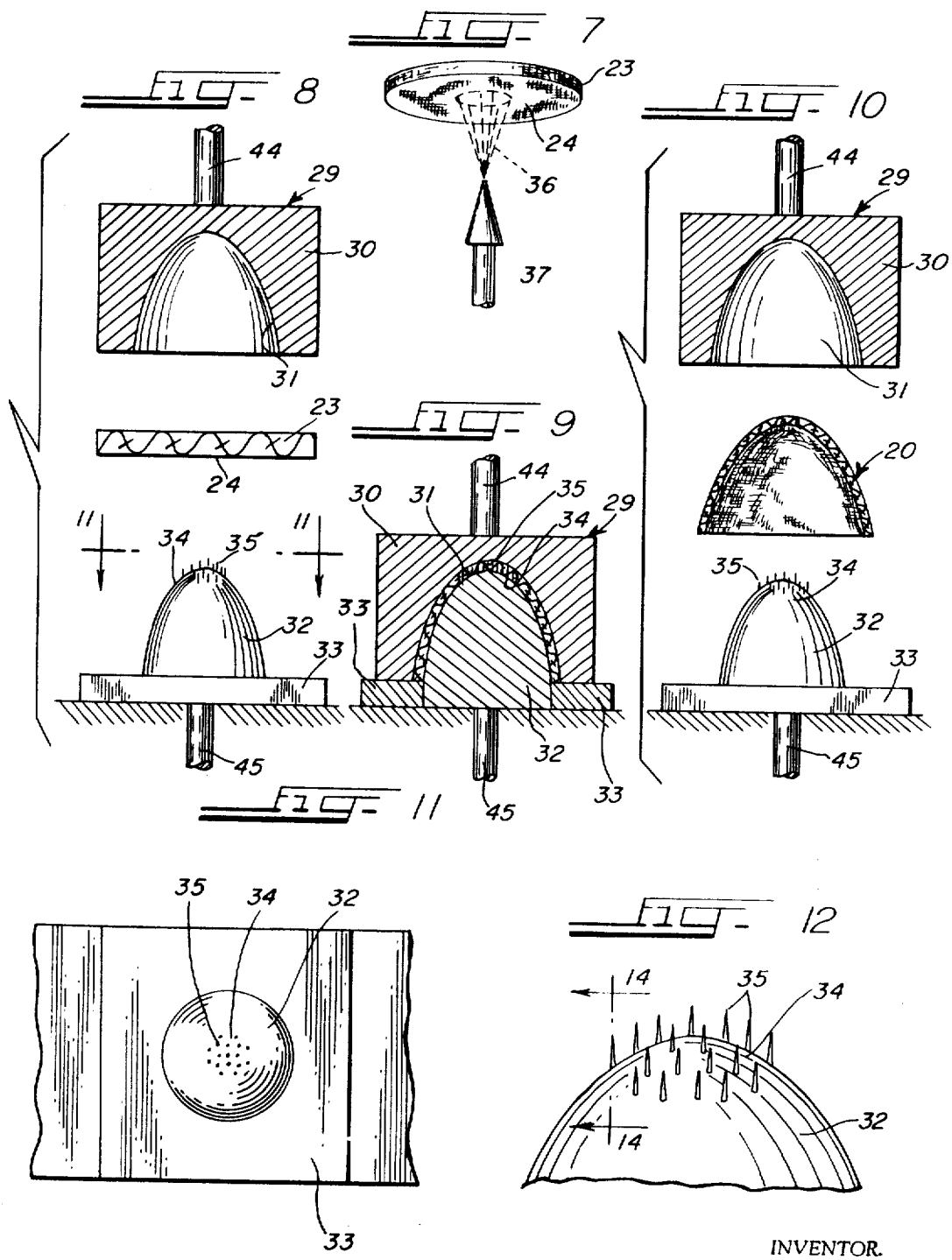

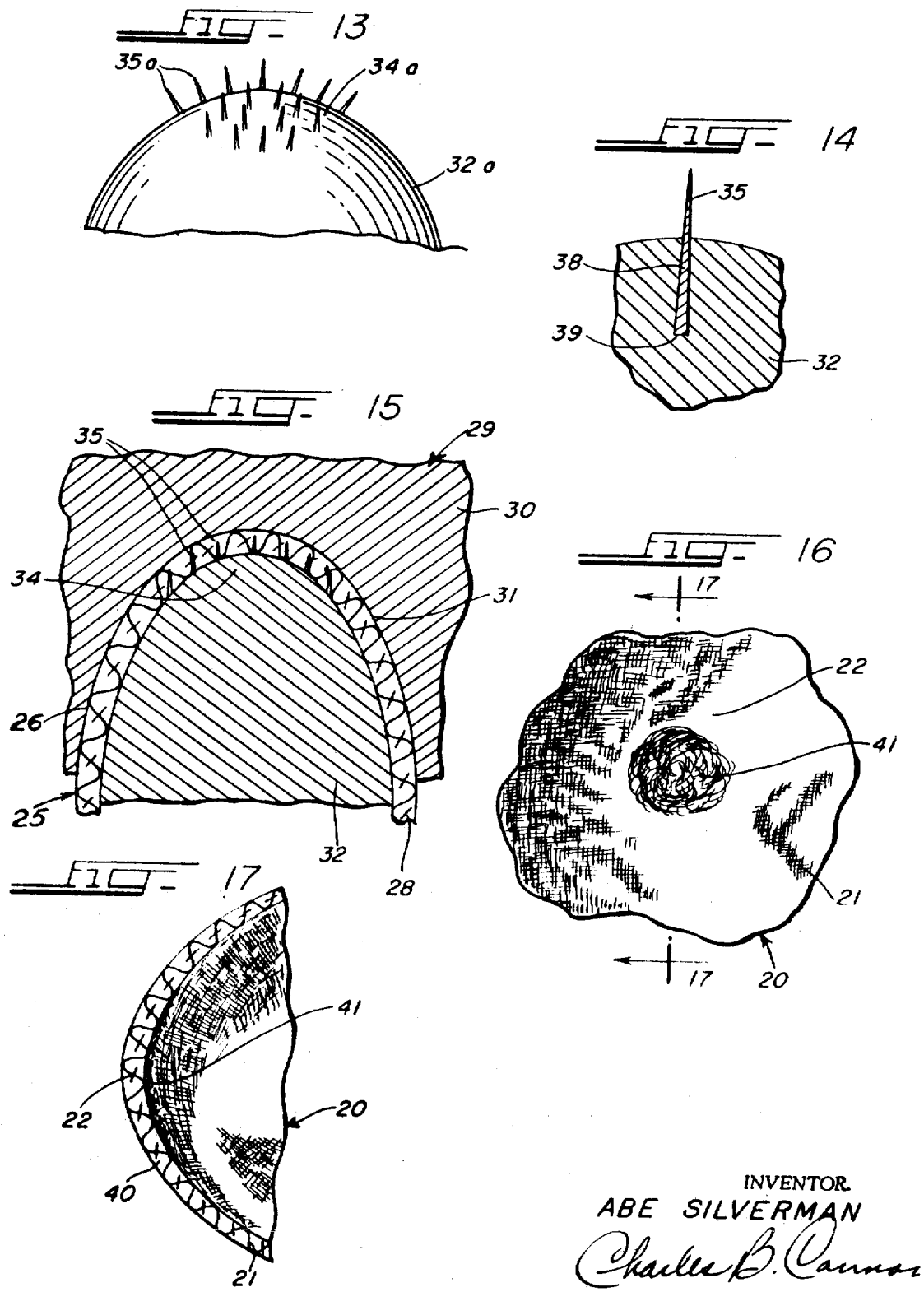

Patented Aug. 10, 1971
3,597,800
4 Sheets-Sheet 4
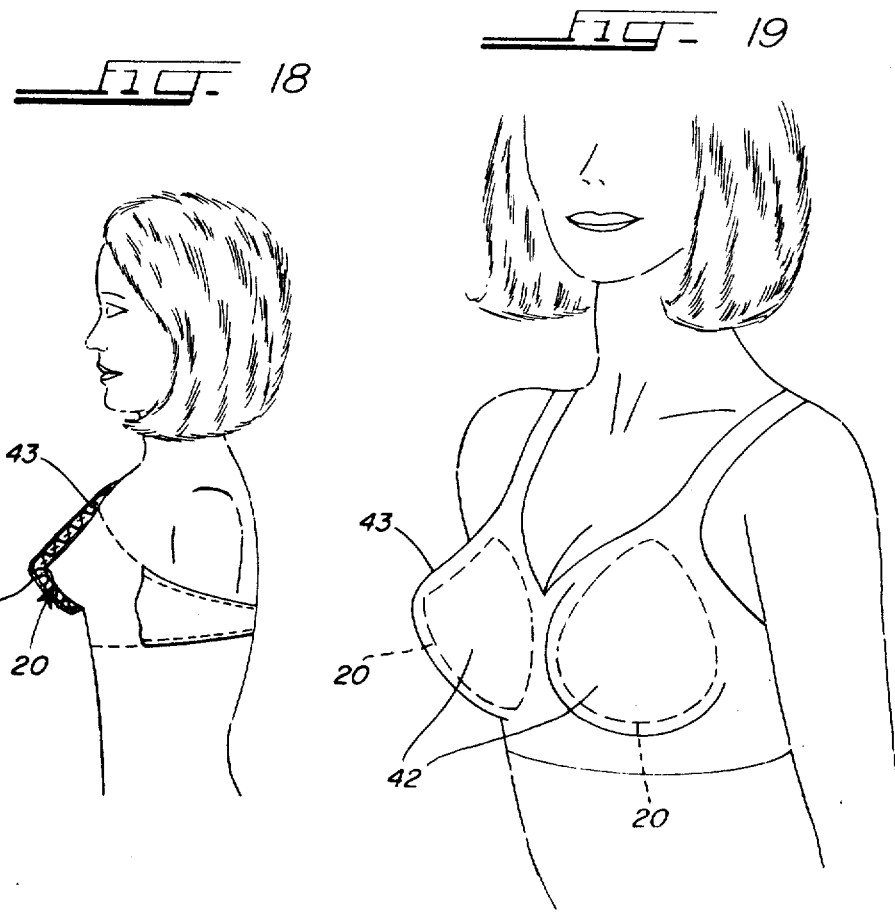
INVENTOR.
ABE SILVERMAN
His Att'y.

APPARATUS FOR MAKING BRASSIERE PADS

This invention relates to brassiere pads or cups and a method and apparatus for making the same.

More particularly, this invention relates to molded seamless brassiere pads or cups and to a method and apparatus for making the same from suitable materials such as fibrous materials known as bonded nonwoven fibrous batting, made of polyester fibers, or other suitable fibers, typical examples of such nonwoven fibrous batting materials being those made of polyester fibers such as KODEL (Eastman) and DACRON (duPont).

One of the problems heretofore experienced in the art of making molded seamless brassiere pads or cups from bonded nonwoven fibrous batting, including full brassiere pads and so-called contour pads is the problem of preventing thinning of the material in the outer apex portion of the generally conical-shaped pad during the molding operation, and when heat and pressure are applied to the blank during the molding operation. Various ways have been suggested heretofore to overcome this problem, but many of these have been complex and unsatisfactory.

Accordingly, an object of the present invention is to provide a new and improved molded seamless brassiere pad or cup and a new and improved method and apparatus for molding the new seamless molded brassiere pads of suitable materials such as fibrous nonwoven batting made of polyester fibers such as KODEL (Eastman) and DACRON (duPont).

Another object of the invention is to provide a new and improved generally conical-shaped molded seamless brassiere pad or cup which is not substantially thinned in cross section or otherwise weakened in the apex portion thereof as an incident to or as a result of the molding operation.

A further and more particular object of the invention is to provide a new and improved apparatus for molding the new generally conical-shaped molded seamless brassiere pads or cups in such a manner that thinning of the apex portion of the fibrous nonwoven batting stock material and of the resulting molded seamless brassiere pads or cups as an incident to the molding operation is avoided with the result that a new molded seamless brassiere pad is provided in which the apex portion has substantially the same cross-sectional thickness as the remaining portions of the wall area of the pad or in which the cross-sectional thickness of the apex portion is somewhat greater than the cross-sectional thickness of the remaining portions of the wall of the pad.

Other objects will appear hereinafter.

IN THE DRAWINGS

FIG. 1 is a perspective view of a typical blank of fibrous nonwoven material which may be employed in the practice of the present invention in making the new molded seamless brassiere pad;

FIG. 2 is an elevational view of the new molded seamless brassiere pad form prior to the time it is trimmed after the molding operation;

FIG. 3 is a side elevational view of a typical form of the new molded seamless brassiere pad or cup in completed form;

FIG. 4 is a top plan view of a typical form of the new molded seamless brassiere pad;

FIG. 5 is a front elevational view of the molded seamless brassiere shown in FIGS. 3 and 4;

FIG. 6 is a transverse sectional view on line 6–6 in FIG. 4;

FIG. 7 is a schematic view illustrating a preliminary step in the method of making the new molded seamless brassiere pads;

FIG. 8 is an exploded view, partly in section, of the new molding apparatus employed in the practice of the present invention;

FIG. 9 is a sectional view showing the parts of the new molding apparatus illustrated in FIG. 8 and the blank of fibrous nonwoven batting material as they appear during the molding operation;

FIG. 10 is an exploded view, partly in section, showing the molding apparatus of FIGS. 8 and 9 with the untrimmed molded seamless brassiere pad unit, as shown in FIG. 2, removed therefrom after the molding operation;

FIG. 11 is a top plan view of the new male mold unit, on line 11–11 in FIG. 8;

FIG. 12 is a fragmentary elevational view of the new male mold unit illustrated in FIGS. 8, 9, 10 and 11;

FIG. 13 is a fragmentary elevational view of a modified form of the new male mold unit;

FIG. 14 is an enlarged sectional detail view of the new male mold unit, on line 14–14 in FIG. 12;

FIG. 15 is an enlarged fragmentary sectional view of the new molding apparatus with the fibrous nonwoven batting blank unit disposed therein during the molding operation;

FIG. 16 is a fragmentary bottom plan view of the new molded seamless brassiere pads;

FIG. 17 is a transverse sectional view on line 17–17 in FIG. 16;

FIG. 18 is a diagrammatic view partly in section, showing a typical use of the new molded and seamless brassiere pad made in accordance with the invention; and FIG. 19 is a perspective view of the parts shown in FIG. 18.

A typical embodiment of the new molded seamless brassiere pad or cup which may take the form of a contour pad, or a full inflation pad, is generally indicated at 20 in the drawings and comprises a generally conical-shaped body 21 having an open inner end and closed outer apex portion 22. The new molded seamless brassiere pad may be made from fibrous nonwoven batting composed of thermoplastic adhesive bonded fibers such as polyester fibers of which KODEL (Eastman) and DACRON (duPont) are typical, and in the practice of the invention a blank of such material for use in molding the new seamless brassiere pads illustrated in FIG. 1, where it is generally indicated at 23, and is shown as being generally circular or disc-shaped in form, and as having central portion 24, which will be referred to hereinafter. The blank 23 of bonded nonwoven fibrous batting is composed of loosely arranged fibers, as are referred to hereinafter.

A typical embodiment of the new molded seamless brassiere pad form as it is formed in the mold and before it is trimmed to proper shape, is illustrated in FIG. 2 of the drawings wherein it is generally indicated at 25 and includes a generally conical-shaped body 26 having an open and untrimmed inner end or skirt portion 28 and a closed outer apex portion 27.

A typical form of the new molding apparatus which may be used in the practice of the present invention is indicated at 29 in the drawings and comprises a female mold member 30 having a female mold cavity 31 therein, and a male mold member 32 which is suitably supported at 33 and is generally conical shaped and has an apex portion 34 in which a plurality of sharp pointed needlelike piercing elements 35 are mounted. Each of the piercing elements 35 has an inner end or mounting portion 38 which is rigidly mounted in any suitable manner in a recess 39 formed in the apex portion 34 of the generally conical-shaped male mold member 32, as best shown in FIG. 14.

The piercing elements 35 may be made of steel, or like relatively rigid material, and their inner end portions 38 may be mounted in the recesses 39 in the male mold member 32 in any suitable manner as by soldering, swedging, or the like.

As shown in FIGS. 8, 9, 10, 11 and 12, the piercing elements 35 are spaced at intervals within and around the apex portion 34 of the generally conical-shaped male mold member 32 and they are preferably all disposed within the upper one-fourth of the external surface area of the male mold element 32.

In the form of the invention shown in FIGS. 8, 9, 10, 11 and 12, the piercing elements 35 extend generally parallel relative to the longitudinal axis of the male mold member 32 although, if desired, they may extend perpendicularly or at other angles relative to the external surface of the male mold member 32, as will be described further hereinafter.

Either or both of the mold members 30 and 32 may be electrically or otherwise heated, as desired, and for this purpose an electrical heating element 44 is shown as being attached to the female mold member 30 and an electrical heating element 45 is shown as being connected to the male mold member 32.

OPERATION

In the practice of the present invention, a disc-shaped or like blank of the relatively thick fibrous nonwoven bonded batting material 23, which may be composed of adhesively bonded polyester fibers such as KODEL (Eastman) or DACRON (duPont) or other thermoplastic adhesively bonded fibers, is cut and shaped into the desired form and the bottom surface of the central portion 24 thereof is then sprayed or otherwise subjected to the action of a liquid vapor or gaseous coolant. For this purpose there may be employed a spray of water 36 or other coolant from a suitable spray unit 37 so as to moisten a part of the central area 24 of the blank 23 without causing the water or other coolant medium to penetrate through the entire body of the blank 23. The area 24 of the blank 23 thus sprayed with the coolant 36 corresponds generally to the area of the external surface of the apex portion 34 of the male mold member 32 in which the piercing elements 35 are arranged, for reasons which will be pointed out hereinafter.

After the central bottom portion 24 of the blank of fibrous nonwoven batting 23 has thus been sprayed with water, or like coolant, the thus sprayed blank 23 is inserted as in FIG. 8 between the male mold member 32 and the female mold member 30, whereupon the female mold member 30 is manually or otherwise lowered onto the upper surface of the blank 23, and as the female mold member 30 is further lowered it moves the blank 23 down onto the male mold member 32. During this operation the piercing elements 35 penetrate the lower portion 24 of the body of the fibrous nonwoven batting blank 23, which has been sprayed with the coolant 36, until the parts assume the position in which they are shown in FIG. 15.

As the female mold member 30 is thus brought down onto the blank 23, one or both of the mold members 30 and 32 may be heated, as desired, and the blank 23 is thus shaped and molded between the male mold member 32 and the cavity 31 in the female mold member 30. During this operation the sprayed and cooled central portion 24 of the blank 23 is partially held against stretching and thinning by the engagement of the piercing elements 35 with the fibers of the fibrous nonwoven batting in the sprayed and cooled central bottom portion 24 of the body of the fibrous nonwoven batting blank 23.

Hence, as the molding operation continues, and is completed, a skinlike glazed crusted, relatively smooth surface 40 is mold-formed on the entire outer surface of the generally conical-shaped molded seamless brassiere pad 20, and throughout all of the inner area of the molded seamless brassiere pad 20 except the portion 24 of the inner surface of the apex portion 22 thereof, which has been sprayed with the coolant 36, and in the latter area the fluffy fibers of the fibrous nonwoven batting 41 remain partially unencrusted, as is shown in FIGS. 16 and 17 of the drawings. Thus, the area 24-41 of the body of the blank 23 which has been subjected to the cooling action of water, or like coolant, does not become molded because the thermoplastic adhesive bond which is embodied in the fibrous nonwoven batting material in the area 24-41 of the pad is not softened by the action of the heat and pressure to which the blank 23 is subjected during the molding operation.

The result of this is that the cone-shaped apex portion 22 of the new brassiere pad 20 is not thinned in cross-sectional thickness, or stretched, or otherwise weakened during the molding operation relative to the remaining wall portions of the pad or cup, and a problem heretofore experienced in the art is thus overcome while, at the same time, no unsightly holes or like objectionable marks of the piercing elements 35 are formed in or appear in the completed molded pad 20. This is due to the fact that the piercing elements 35 engage only that part of the loosely arranged fibers 41 of the body of bonded nonwoven batting material in the blank 23 which has been subjected to the action of the water spray or like coolant 36, and hence the thermoplastic adhesive bond in such fibers 41 is not softened under the action of heat and pressure during the molding operation with he result that such fibers 41 are not molded into a compact molded form but remain in their original unencrusted form, as shown in FIGS. 16 and 17.

After the completion of the molding operation the inner marginal edge or skirt portion 28 of the then molded pad form 25 (FIG. 2) is trimmed therefrom to provide the complete fully molded and shaped pad 20.

A modification of the male mold member is shown in FIG. 13 of the drawings, and those parts thereof which are similar to or correspond to parts of the male mold unit 32 shown in FIGS. 8, 9, 10, 11 and 12, are given the same reference numerals, followed by the additional and distinguishing reference character a.

Thus, the form of the male mold member 32a shown in FIG. 13 is substantially the same as that shown in FIGS. 8, 9, 10, 11 and 12, except that in this form of the invention the piercing elements 35a extend perpendicularly or at right angles to the external surface of the apex portion 34a of the male mold member 32a rather than vertically relative to the longitudinal axis thereof, as in the form of the invention shown in FIGS. 8 to 12, inclusive.

The new molded seamless brassiere pads 20 may take the form of so-called full brassiere pads or contour pads, and a typical form and use thereof are indicated in FIGS. 18 and 19 of the drawings, wherein one form of the new molded seamless brassiere pad 20 is shown as being in the form of a full inflation brassiere pad (or a contour pad) disposed within the cup 42 of a typical brassiere 43, as is well understood in the art.

A typical form of the bonded nonwoven fibrous batting material which may be used in the practice of this invention is exemplified by the material which is described in the article entitled "Fiberfill—What Is It?" which appears in Corset & Underwear Review magazine for June 1965, commencing at page 154, and a suitable quality of this material for use in the practice of the present invention is that which is therein referred to as made by Kem-Wove Industries, Inc. This material is characterized by possessing strength in all directions, high resilience, and excellent washability.

Such a material includes a mass or body of multidirectional polyester fibers which interest each other in random fashion at numerous points and such fibers are deep bonded together at their points of intersection, by means of a suitable thermoplastic resinous adhesive bonding material which is sprayed thereon and throughout the entire body of the material, as distinguished from surface spray penetration, as is well understood in the art.

In the practice of the present invention, the bonded nonwoven fibrous batting material employed in making the new brassiere pads, and as referred to hereinbefore and hereinafter, may have a binder content of from approximately 30 percent to approximately 50 percent and a fiber content of from approximately 70 percent to approximately 50 percent.

In the practice of the present invention, the temperature of the female mold member 30, or of the male mold member 32, as desired, during the molding operation illustrated in FIGS. 8 to 12, inclusive, is preferably maintained in the order of from about 200° F. to about 450° F. depending, in part, upon the particular bonded nonwoven fibrous batting material employed in making the new molded seamless brassiere pads, the characteristics desired in the resulting brassiere pad including its relative thickness, hardness, the glaze to be imparted to its outer surface, and other characteristics.

In making so-called full brassiere pads in accordance with the practice of the present invention, the bonded nonwoven fibrous batting 20 employed in the blank 23 may have an initial thickness in the order of from about five-eighths inch to about 1 inch prior to the molding operation, and after the forming or molding operation the thickness of the molded body 21 of the pad 20 is preferably in the order of from about three-eighths inch to about five-eighths inch.

In making the so-called contour molded seamless brassiere pads in accordance with the practice of the present invention, the initial thickness of the bonded nonwoven fibrous batting employed is preferably in the order of from about three-eighths inch to about 1 inch and the preferred thickness of the finished molded contour seamless brassiere pad after the completion of the molding operation is in or about one-eighth inch to about one-fourth inch.

It will thus be seen from the foregoing description, considered in conjunction with the accompanying drawings, that the present invention provides a new and improved molded seamless brassiere pads, and a new and improved apparatus and method for forming the same, and that the invention thus has the desirable advantages and characteristics, and accomplishes its intended objects, including those hereinbefore pointed out and other which are inherent in the invention.

I claim:

1. Apparatus for molding a seamless generally conical-shaped brassiere pad from a blank of nonwoven bonded fibrous batting comprising, in combination,
   a. a female mold member having a female mold cavity therein;
   b. a generally conical-shaped male mold member having an external surface projecting into the said female mold cavity in the said female mold member with the said blank of nonwoven fibrous batting disposed around the said male mold member and within the said female mold cavity of the said female mold member;
   c. the said generally conical-shaped mold member including
      1. an apex portion having mounted thereon
   d. a plurality of piercing elements projecting from the said apex portion of the said male mold member at spaced intervals thereon into the said female mold cavity in the said female mold member; and
   e. the said piercing elements, acting as a means for penetrating and engaging in the fibers of the said nonwoven bonded fibrous batting when the said female mold member and the said generally conical-shaped male mold member are in assembled position with a blank of the said nonwoven bonded fibrous batting disposed therebetween.

2. Apparatus as defined in claim 1 in which
   a. the said piercing elements are disposed throughout approximately one-fourth of the external surface area of the said apex portion of the said male mold member.

3. Apparatus as defined in claim 1 in which
   a. the said piercing elements extend generally perpendicularly and generally parallel relative to the longitudinal axis of the said male mold member.

4. Apparatus as defined in claim 1 in which
   a. the said piercing elements extend generally perpendicularly or at right angles relative to the external surface of the said apex portion of the said male mold member.